Feb. 10, 1970   I. C. PORTER   3,494,039
MAP SCALING DEVICE
Filed Sept. 13, 1968
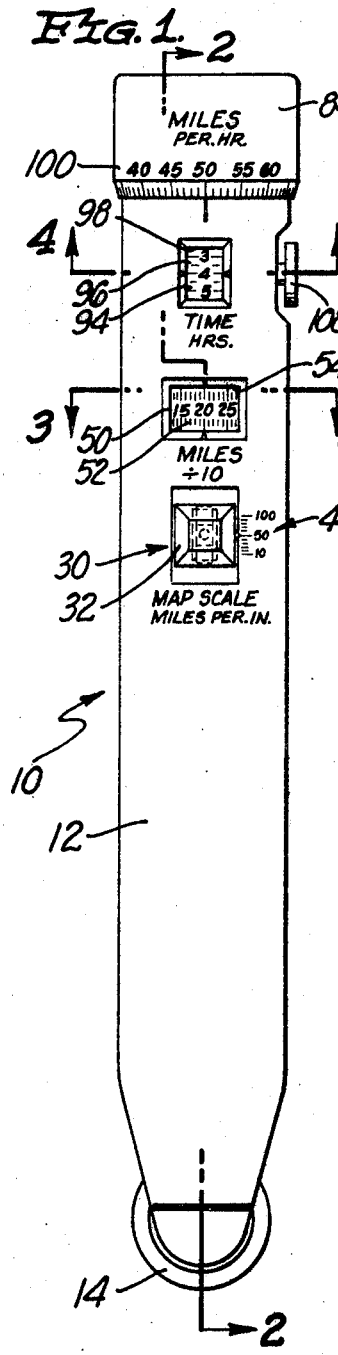
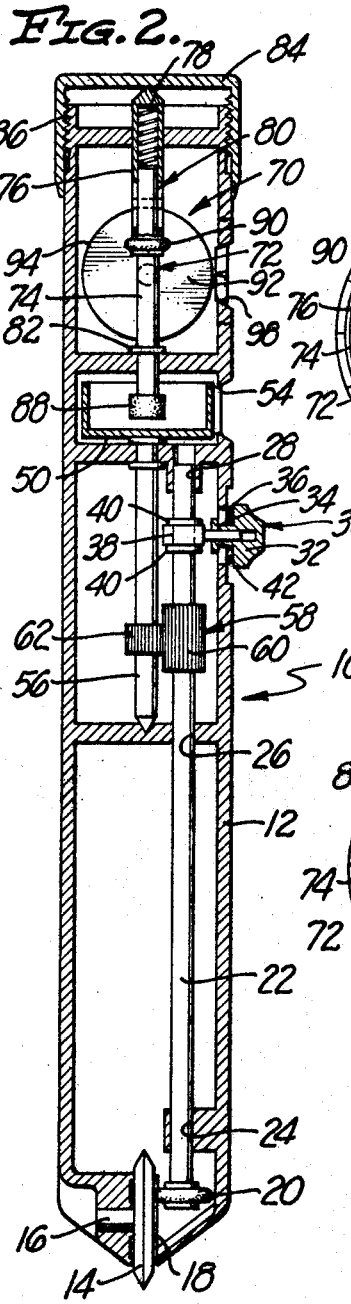
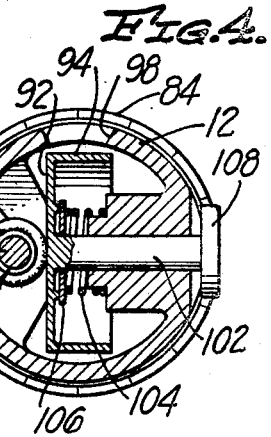
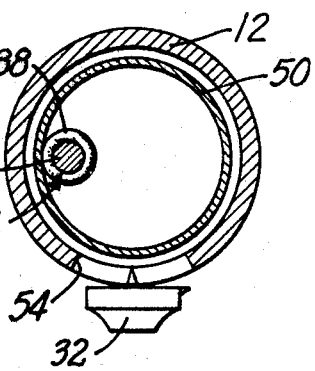
INVENTOR
IRWIN C. PORTER
BY HIS ATTORNEYS
HARRIS, KIECH, RUSSELL & KERN

United States Patent Office 3,494,039
Patented Feb. 10, 1970

3,494,039
MAP SCALING DEVICE
Irwin C. Porter, Quinter, Kans. 67752
Filed Sept. 13, 1968, Ser. No. 759,679
Int. Cl. G01b 3/12
U.S. Cl. 33—142
8 Claims

ABSTRACT OF THE DISCLOSURE

A device for measuring distances between points on maps of different scales, and for indicating the times required to travel such distances at different speeds. The device includes a housing carrying a map scaling wheel rollable over a map between two points thereon. The housing carries a distance indicator connected to the map scaling wheel by a variable-ratio friction drive to accommodate different map scales. The housing also carries a travel time indicator which is connected to the distance indicator by another variable-ratio friction drive to accommodate different travel speeds. Thus, the device simultaneously measures the distance between two points on a map and the time required to travel such distance, for any map scale and travel speed within the range of the device.

BACKGROUND OF INVENTION

The present invention relates in general to map scaling devices and, more particularly, to a device for measuring distances between points on maps of different scales, and for measuring the times required to travel such distances at different speeds.

Map scaling devices of the foregoing type conventionally comprise: a housing; a rotatable map scaling member, such as a wheel, carried by and projecting from the housing and rollable over a map to be scaled between two points thereon; means capable of accommodating different map scales for converting the angular displacement of the map scaling wheel into an indication of the distance between the two points, usually in miles; and means capable of accommodating different travel speeds for converting the angular displacement of the map scaling wheel into an indication of the time required to travel the distance between the two points, the time usually being indicated in hours.

Prior devices of the foregoing nature are subject to various disadvantages. For example, they frequently are complicated devices involving such things as complex gear trains. Often, prior devices of this type are capable of accommodating only a couple of map scales, mental conversions of the distances and the travel times being required if the devices are used with maps drawn to any other scales. Also, in converting from one map scale to another, manual gear changes, or variable-ratio gear trains, are required. Further, conventional devices of the type to which the invention relates usually are capable of indicating travel time between two points at one speed only, thereby requiring mental conversions to obtain travel times for other speeds. Those prior devices which do provide indications of travel times at different speeds require such things as manual gear changes, variable-ratio gear trains, or other equally complex expedients and/or mechanisms.

SUMMARY AND OBJECTS OF INVENTION

With the foregoing as background, the primary object of the invention is to provide a very simple device for measuring distances on maps of different scales, and for measuring travel times at different speeds, which requires only very simple components and which avoids the use of such complex mechanisms as long gear trains, and the like.

An important object of the invention is to provide a device which is capable of accommodating an infinite number of map scales within its operating range, and which is also capable of accommodating an infinite number of travel speeds within its operating range.

More particularly, an important object of the invention is to provide an infinitely-variable-ratio friction drive between the map scaling wheel and a rotatable distance indicator carried by the housing of the device. With this construction, any map scale within the operating range of the device is accommodated very simply, which is an important feature.

Still more particularly, another important object of the invention is to provide another infinitely-variable-ratio friction drive between the map scaling wheel and a rotatable travel time indicator carried by the housing to enable the device to accommodate any travel speed within its operating range, without resort to mental conversions, complex mechanisms, and the like.

A more specific object of the invention is to provide a device for measuring distances on maps of different scales, which includes: an elongated housing; a wheel carried by and projecting from one end of the housing and rollable over a map, the wheel being rotatable relative to the housing about an axis extending transversely of the housing and having on one side thereof an annular surface of varying radius; a roller shaft carried by the housing and rotatable about an axis extending longitudinally of the housing, the roller shaft being shiftable axially of its axis; a roller fixed on the roller shaft and frictionally engaging the annular surface of the wheel; means connected to the roller shaft for shifting the roller shaft axially of its axis to frictionally engage the roller with the annular surface of the wheel at radii from the axis of the wheel corresponding to different map scales; and indicating means carried by the housing and connected to and driven by the roller shaft.

Another more specific object of the invention is to provide a device for measuring the time required to travel the distance between two points on a map at any travel speed within the operating range of the device, which includes: a housing; a rotatable travel time indicator carried by the housing and having an annular surface of varying radius relative to the axis of rotation of the travel time indicator; a shaft carried by and rotatable relative to the housing about an axis perpendicular to and intersecting the axis of the travel time indicator, the shaft being shiftable axially of its axis; a roller carried by the shaft and frictionally engageable with the annular surface of the travel time indicator at radii respectively corresponding to different travel speeds in response to axial shifting of the shaft; means carried by the housing and engaging the shaft for axially shifting the shaft to position the roller in frictional engagement with the annular surface of the travel time indicator at radii respectively corresponding to different travel speeds; and means carried by the housing and connected to the shaft for rotating the shaft through an angle corresponding to the distance between the two points on the map, such means including a map scaling wheel rollable over the map between the points mentioned.

The foregoing objects, advantages, features and results of the present invention, together with various other objects, advantages, features and results thereof which will be evident to those skilled in the map scaling art in the light of this disclosure, may be achieved with the exemplary embodiment of the invention which is illustrated in the accompanying drawing and which is described in detail hereinafter.

DESCRIPTION OF DRAWING

In the drawing:

FIG. 1 is a front elevational view of a map scaling device which embodies the invention;

FIG. 2 is a longitudinal sectional view of the device which is taken as indicated by the arrowed line 2—2 of FIG. 1;

FIG. 3 is an enlarged, transverse sectional view taken as indicated by the arrowed line 3—3 of FIG. 1; and FIG. 4 is an enlarged, transverse sectional view taken as indicated by the arrowed line 4—4 of FIG. 1 of the drawing.

DETAILED DESCRIPTION OF EXEMPLARY EMBODIMENT OF INVENTION

In the drawing, the numeral 10 designates generally an exemplary may scaling device which embodies the essential features of the invention. Preferably, the device 10 is generally cylindrical and is approximately the shape and size of, although slightly larger than, an ordinary fountain pin or mechanical pencil, so that it can conveniently be carried in a pocket or purse.

More particularly, the map scaling device 10 of the invention includes a generally cylindrical housing 12 provided at one end with a projecting, rotatable map scaling member or wheel 14 rollable over a map, not shown, to be scaled. The wheel 14 is rotatable relative to the housing 12 about an axis extending transversely of the housing, as by rotatably mounting the wheel on a transverse axle 16.

For maximum convenience in utilizing the map scaling device 10, the central plane of the wheel 14 preferably coincides with a central longitudinal plane of the housing 12. At least the periphery of the wheel 14 is made of a suitable friction material, or is roughened, or the like, to cause the wheel to roll over the surface of a map without slipping. The periphery of the wheel 14 is also preferably sharp-edged so that the user can cause the wheel periphery to follow accurately a line, such as a road or highway, on a map.

The wheel 14 is provided on one side thereof with an exposed, preferably flat, annular surface 18 of varying radius relative to the axis of rotation of the wheel, i.e., an annular surface 18 having an infinite number of radii progressively increasing from the axis of rotation. Frictionally engageable with the annular surface 18 of the wheel 14 at a varying radius from the axis rotation of the wheel is a roller 20 carried by a roller shaft 22 rotatable about an axis extending longitudinally of the housing 12 and perpendicular to and intersecting the axis of the wheel 14, at least the periphery of the roller 20 being made of a suitable friction material. The roller shaft 22 is offset laterally from the central longitudinal axis of the housing because of the location of the plane of the map scaling wheel 14 on such axis, the roller shaft being journaled in suitable bearings 24, 26 and 28 which are shown as formed integrally with the housing 12.

In order to permit frictional engagement of the roller 20 with the annular surface 18 of the map scaling wheel 14 at different radii from the axis of rotation of the wheel, the roller shaft 22, in addition to being rotatable in its bearings 24, 26 and 28, is also axially slidable in such bearings. This results in varying the friction drive ratio between the map scaling wheel 14 and the roller 20, i.e., it results in varying the angular displacement of the roller 20 for a given angular displacement of the wheel 14, corresponding to a given distance between two points on a map being scaled.

As will be apparent, the drive ratio between the map scaling wheel 14 and the roller 20 may be varied to accommodate a particular map scale by positioning the roller 20 at the proper radius from the axis of rotation of the wheel 14. To accomplish this, means 30 is provided for shifting the roller shaft 22 longitudinally of its axis to vary the radial distance of the point of engagement between the roller 20 and the wheel 14 relative to the axis of rotation of the wheel. The shifting means 30 is shown as comprising a button 32 engageable by the user's thumb or forefinger, this button having a stem 34 which extends into the housing 12 through a longitudinal slot 36 therein, and which terminates in a collar 38 disposed between two flanges 40 on the roller shaft 22. A leaf spring 42 between and engaging the button 32 and the housing 12 frictionally retains the button in the desired position relative to map-scale indicia 44 on the housing 12 adjacent the button.

It will be apparent that, with the foregoing construction, the user may very easily adjust the map scaling device 10 to the scale of the particular map he is using simply by positioning a pointer, or other suitable indicium, on the button 32 opposite the proper map-scale indicium 44 on the housing 12. This automatically positions the roller 20 at the proper radius from the axis of rotation of the wheel 14 for the scale of the particular map in use.

Rotatable within the housing 12, and preferably about the central longitudinal axis thereof, is a distance indicator 50 having the form of a cup which faces axially of the housing 12 toward the end thereof which is opposite the end carrying the map scaling wheel 14. The external periphery of the skirt of the cup-shaped distance indicator 50 carries a scale 52 visible through a window 54 in the housing 12 and indicating the distance, preferably in miles divided by ten, between any two points on a map being scaled, in response to rolling movement of the map scaling wheel 14 over the map between such points.

The distance indicator 50 is fixedly mounted on a coaxial distance indicator shaft 56 adjacent and spaced laterally from the roller shaft 22. A suitable driving connection 58 transmits rotation of the roller shaft 22 to the distance indicator shaft 56. For example, the driving connection 58 is illustrated as comprising two spur gears 60 and 62 on the roller and distance indicator shafts 22 and 56. One of these gears, e.g., the gear 60, is sufficiently elongated to maintain the two gears in mesh throughout the entire range of axial movement of the roller shaft 22.

Summarizing the operation of the map scaling device 10 as thus far described, it will be apparent that angular displacement of the map scaling wheel 14, in rolling over a map between two points thereon, is converted into the angular displacement of the distance indicator 50 which is required to indicate the correct distance between the two points on the map for the particular map scale involved. As previously discussed, this effect is achieved by moving the map-scale button 32 into the proper position to locate the roller 20 the correct radial distance from the axis of rotation of the map scaling wheel 14.

In addition to measuring distance for any of an infinite number of map scales within its operating range, the map scaling device 10 of the invention is also capable of determining the time required to travel the distance measured from the map at any of an infinite number of travel speeds within its operating range. For this purpose, the device 10 is provided, between the distance indicator 50 and the end of the device opposite the map scaling wheel 14, with an infinitely adjustable travel time measuring means 70. In the particular construction illustrated, the travel time measuring means 70 is driven by the map scaling wheel 14 through the rotatable distance indicator 50 and the hereinbefore-described connections between the map scaling wheel and the rotatable distance indicator.

Considering the travel time measuring means 70 more specifically, it includes a telescoping travel time shaft 72 carried by and rotatable relative to the housing 12 about an axis extending longitudinally of the housing and offset laterally from the central longitudinal axis thereof. The telescoping shaft 72 includes telescopically interconnected driving and driven portions 74 and 76 which are biased axially apart, as by a compression spring 78, and which are keyed together for concurrent rotation, as by a pinand-slot connection 80. The driving portion 74 of the telescoping shaft 72 in equipped with a thrust collar 82 which bears against a wall of the housing 12 to resist axial displacement by the spring 78. Consequently, the spring 78 biases the driven portion 76 of the telescoping shaft 72 axially, relative to the driving portion 74, against a cap 84 threaded on the end 86 of the housing 12. The function of the cap 84 will be discussed in more detail hereinafter.

The driving portion 74 of the telescoping shaft 72 has fixed thereon a roller 88 having a periphery of friction material which engages the internal periphery of the skirt of the distance indicator 50 in driving relation. Consequently, when the map scaling wheel 14 rotates the distance indicator 50, through an angle corresponding to the distance traversed by the wheel 14 for a particular map scale, the distance indicator angularly displaces the telescoping shaft 72 a proportional amount.

The axially movable, driven portion 76 of the telescoping shaft 72 has fixed thereon a roller 90 at least the periphery of which is made of friction material. The roller 90 frictionally engages a varying-radius annular surface 92 of a travel time indicator 94 carried by the housing 12 and rotatable relative thereto about a transverse axis perpendicular to and intersecting the axis of the telescoping shaft 72. In the particular construction illustrated, the travel time indicator 94 is cup shaped and the varying-radius annular surface 92 is formed by the closed end of the cup. The external periphery of the travel time indicator 94 is provided thereon with a travel time scale 96, preferably calibrated in hours, which is visible through a window 98 in the housing 12.

The hereinbefore-mentioned cap 84 threaded on the end 86 of the housing 12 is provided on its skirt with a scale 100 of speeds, preferably in miles per hour, at which the distance between any two points on a map may be traveled. Rotation of the cap 84 relative to the housing 12 results in axial displacement of the driven portion 76 of the telescoping shaft 72 to position the roller 90 at radii from the axis of rotation of the travel time indicator 94 corresponding to different travel speeds. By positioning the cap 84 so that the desired travel speed is opposite a fixed indicium on the housing 12, the roller 90 is automatically positioned at the proper radius, relative to the axis of rotation of the travel time indicator 94, to cause the travel time indicator to indicate the correct travel time between any two points on a map being scaled.

Considering the over-all operation of the device 10, the user first adjusts the position of the button 32 to correspond to the scale of the map being used, and adjusts the position of the cap 84 to the average speed he wants to travel, or estimates he can travel. Then, he rolls the map scaling wheel 14 over the map, along the route he wishes to travel, from the desired starting point to the desired terminal point. The distance indicator 50 automatically indicates the distance between the two points, the scale of the map automatically being accommodated by proper positioning of the roller 20 relative to the wheel 14 by means of the button 32. At the same time, the travel time indicator 94 automatically indicates the time required to travel the distance between the two points on the map at the average speed for which the cap 84 has been positioned, the cap automatically locating the roller 90 at the proper radius from the axis of rotation of the travel time indicator for the desired travel speed. Thus, in one operation, and with only simple adjustments, the map scaling device 10 automatically provides the distance between two points on the map and the travel time between such points, for any map scale and travel speed within the operating range of the device.

It will be understood that while the device 10 has been described as measuring distance in miles and as measuring time in hours on the basis of a preselected speed in miles per hour, the device may be calibrated in any other units which may be desired.

The travel time indicator 94 is provided with a coaxial stem 102 journaled in and axially movable relative to the housing 12. A compression coil spring 104 seated at one end against the housing 12 and at the other end against a washer 106 engaging the closed end of the indicator 94 serves to maintain the surface 92 in engagement with the roller 90.

To reset the device 10 to zero, the stem 102, which is preferably provided with a knurled knob 108, is first turned until the distance indicator 50 reads zero. Thereafter, the stem 102 is pulled outwardly against the action of the spring 104 to disengage the travel time indicator 94 from the roller 90. The stem 102 is then rotated until the travel time indicator 94 also reads zero. The device 10 is then ready for use again.

Although an exemplary embodiment of the invention has been disclosed herein for purposes of illustration, it will be understood that various changes, modifications and substitutions may be incorporated in such embodiment without departing from the spirit of the invention as defined by the claims appearing hereinafter.

I claim as my invention:

1. In a device for scaling maps of different scales, the combination of:
   (a) a housing;
   (b) a rotatable map scaling member carried by and projecting from said housing and rollable over a map;
   (c) said map scaling member having an annular surface of varying radius relative to the axis of rotation thereof;
   (d) a shiftable roller frictionally engageable with said annular surface at different radii from the axis of rotation of said map scaling member respectively corresponding to different map scales;
   (e) means carried by said housing for shifting said roller relative to said annular surface of said map scaling member to position said roller in frictional engagement with said annular surface at different radii from the axis of rotation of said map scaling member respectively corresponding to different map scales; and
   (f) indicating means carried by said housing and connected to and driven by said roller.

2. In a device for scaling maps of different scales, the combination of:
   (a) an elongated housing;
   (b) a wheel carried by and projecting from one end of said housing and rollable over a map, said wheel being rotatable relative to said housing about an axis extending transversely of said housing and having on one side thereof an annular surface of varying radius;
   (c) a roller shaft carried by said housing and rotatable about an axis extending longitudinally of said housing, said roller shaft being shiftable axially of its axis;
   (d) a roller fixed on said roller shaft and frictionally engaging said annular surface of said wheel;
   (e) means connected to said roller shaft for driving said roller shaft axially of its axis to frictionally engage said roller with said annular surface of said wheel at radii from the axis of said wheel corresponding to different map scales; and
   (f) indicating means carried by said housing and connected to and driven by said roller shaft.

3. A map scaling device according to claim 2 wherein said indicating means includes:
   (a) a distance indicator shaft carried by and rotatable relative to said housing about an axis parallel to and spaced from the axis of said roller shaft;
   (b) means providing for shifting of said roller shaft axially of its axis for transmitting rotation of said roller shaft to said distance indicator shaft; and
   (c) a distance indicator connected to and driven by said distance indicator shaft.

4. A map scaling device according to claim 3 wherein said distance indicator is a cup-shaped indicator coaxial with said distance indicator shaft and facing longitudinally of said housing toward the other end thereof and having its external periphery calibrated in terms of distance, said map scaling device further including:
   (a) a telescoping travel time shaft carried by and rotatable relative to said housing about an axis extending longitudinally of said housing, said travel time shaft including telescopically interconnected driving and driven portions and means interconnecting same for transmitting rotation of said driving portion to said driven portion;
   (b) a roller fixed on said driving portion of said travel time shaft and frictionally engaging the internal periphery of said cup-shaped distance indicator;
   (c) a travel time indicator carried by said housing adjacent said other end thereof and rotatable relative to said housing about a transverse axis perpendicular to and intersecting the axis of said travel time shaft and calibrated on its periphery in terms of travel time;
   (d) a roller on said driven portion of said travel time shaft and frictionally engageable with one side of said travel time indicator at radii from the axis of rotation thereof corresponding to different travel speeds; and
   (e) cap means threaded on said other end of said housing for shifting said driven portion of said travel time shaft axially of its axis to position said roller thereon in engagement with said one side of said travel time indicator at radii from the axis of rotation of said travel time indicator respectively corresponding to different travel speeds.

5. A map scaling device according to claim 2 wherein said indicating means includes a cup-shaped indicator rotatable about an axis extending longitudinally of said housing, and facing longitudinally of said housing toward the other end thereof, and having its external periphery calibrated in terms of distance, said map scaling device further including:
   (a) a telescoping travel time shaft carried by and rotatable relative to said housing about an axis extending longitudinally of said housing, said travel time shaft including telescopically interconnected driving and driven portions and means interconnecting same for transmitting rotation of said driving portion to said driven portion;
   (b) a roller fixed on said driving portion of said travel time shaft and frictionally engaging the internal periphery of said cup-shaped distance indicator;
   (c) a travel time indicator carried by said housing adjacent said other end thereof and rotatable relative to said housing about a transverse axis perpendicular to and intersecting the axis of said travel time shaft and calibrated on its periphery in terms of travel time;
   (d) a roller on said driven portion of said travel time shaft and frictionally engageable with one side of said travel time indicator at radii from the axis of rotation thereof corresponding to different travel speeds; and
   (e) cap means threaded on said other end of said housing for shifting said driven portion of said travel time shaft axially of its axis to position said roller thereon in engagement with said one side of said travel time indicator at radii from the axis of rotation of said travel time indicator respectively corresponding to different travel speeds.

6. In a map scaling device, the combination of:
   (a) a housing;
   (b) a rotatable distance indicator carried by said housing;
   (c) means carried by said housing for rotating said distance indicator through an angle corresponding to the distance between two points on a map;
   (d) a rotatable travel time indicator carried by said housing and having an annular surface of varying radius relative to the axis of rotation of said travel time indicator;
   (e) means connecting said distance indicator to said travel time indicator for rotating said travel time indicator through angles respectively corresponding to the travel times required to travel said distance between said points on the map at different travel speeds, and comprising a roller frictionally engageable with said annular surface of said travel time indicator at radii respectively corresponding to different travel speeds; and
   (f) means for shifting said roller relative to said travel time indicator to engage said roller with said annular surface of said travel time indicator at radii from the axis of rotation of said travel time indicator corresponding to different travel speeds.

7. In a map scaling device, the combination of:
   (a) a housing;
   (b) a rotatable travel time indicator carried by said housing and having an annular surface of varying radius relative to the axis of rotation of said travel time indicator;
   (c) a shaft carried by and rotatable relative to said housing about an axis perpendicular to and intersecting the axis of said travel time indicator, said shaft being shiftable axially of its axis;
   (d) a roller carried by said shaft and frictionally engageable with said annular surface of said travel time indicator at radii respectively corresponding to different travel speeds in response to axial shifting of said shaft;
   (e) means carried by said housing and engaging said shaft for axially shifting said shaft to position said roller in frictional engagement with said annular surface of said travel time indicator at radii respectively corresponding to different travel speeds; and
   (f) means carried by said housing and connected to said shaft for rotating said shaft through an angle corresponding to the distance between two points on a map.

8. A map scaling device according to claim 7 wherein said means for rotating said shaft includes means for indicating said distance between said points on the map.

References Cited

UNITED STATES PATENTS

| | | | |
|---|---|---|---|
| 49,011 | 7/1865 | Tiffany | 33—142 |
| 1,718,052 | 6/1929 | Lineaweaver | 33—141 |
| 2,110,757 | 3/1938 | Clarke | 33—142 |
| 2,416,772 | 3/1947 | Reece | 33—142 |
| 2,972,813 | 2/1961 | Stinton | 33—142 |

STEPHEN J. TOMSKY, Primary Examiner

PO-1050
(5/69)

UNITED STATES PATENT OFFICE
CERTIFICATE OF CORRECTION

Patent No. 3,494,039      Dated February 10, 1970

Inventor(s) Irwin C. Porter

It is certified that error appears in the above-identified patent and that said Letters Patent are hereby corrected as shown below:

Col. 3, line 17 - "may" should be --map--
(page 7, line 4).

Col. 6, line 59 - "driving" should be --shifting--
(claim 2, line 16).

SIGNED AND
SEALED
JUN 23 1970

(SEAL)
Attest:

Edward M. Fletcher, Jr.
Attesting Officer

WILLIAM E. SCHUYLER, JR.
Commissioner of Patents